US005777809A

United States Patent [19]

Yamamoto et al.

[11] Patent Number: 5,777,809

[45] Date of Patent: Jul. 7, 1998

[54] REFLECTION MIRROR FOR A VEHICLE LAMP AND A METHOD OF FORMING THE SAME

[75] Inventors: Norimasa Yamamoto; Masahiro Maeda, both of Shizuoka, Japan

[73] Assignee: Koito Manufacturing Co., Ltd., Tokyo, Japan

[21] Appl. No.: 686,675

[22] Filed: Jul. 26, 1996

[30] Foreign Application Priority Data

Jul. 28, 1995 [JP] Japan .................................. 7-212399

[51] Int. Cl.$^6$ .............................. G02B 5/10; G02B 5/08; G02B 7/182; B60Q 1/04

[52] U.S. Cl. ......................... 359/869; 359/868; 359/867; 359/850; 359/853; 359/851; 362/362; 362/61; 362/32; 362/308

[58] Field of Search ..................................... 359/869, 868, 359/867, 850, 853, 851; 362/362, 61, 308, 32

[56] References Cited

U.S. PATENT DOCUMENTS

| | | | |
|---|---|---|---|
| 1,903,417 | 4/1933 | Grant . | |
| 4,417,300 | 11/1983 | Bodmer . | |
| 5,235,470 | 8/1993 | Cheng | 359/867 |

FOREIGN PATENT DOCUMENTS

| | | | |
|---|---|---|---|
| 0230834 | 8/1987 | European Pat. Off. | 359/850 |
| 406130301 | 5/1994 | Japan | 359/853 |
| 334891 | 9/1930 | United Kingdom . | |
| 2 262 980 | 7/1993 | United Kingdom . | |

*Primary Examiner*—Paul M. Dzierzynski
*Assistant Examiner*—Mohammad Y. Sikder
*Attorney, Agent, or Firm*—Sughrue, Mion, Zinn, Macpeak & Seas, PLLC

[57] ABSTRACT

A reflection mirror has reflection steps formed as portions of respective paraboloids of revolution and disposed between adjacent ones of closed curves formed as lines of intersection of a group consisting of the paraboloids of revolution with different focal distances and a fundamental surface for the reflection surface. The fundamental surface for the reflection surface includes a first curved surface portion and a second curved surface portion connected to the first curved surface portion in the n-th order continuity ($N \geqq 1$). The first curved surface portion is shaped such that when a light beam, which is emitted from a point light source supposed to lie on the principal optical axis of the reflection mirror, is reflected at a reflection point on the first curved surface portion, the light beam reflected thereat is directed substantially parallel to the principal optical axis of the reflection mirror. The second curved surface portion is shaped such that when a light beam, which is emitted from the point light source, is reflected at a reflection point on the second curved surface portion, the light beam reflected thereat is diffused in a given direction.

15 Claims, 8 Drawing Sheets

REFLECTION MIRROR FOR A VEHICLE LAMP AND A METHOD OF FORMING THE SAME

BACKGROUND OF THE INVENTION

The present invention relates to a reflection mirror for a vehicle lamp such as a tail lamp, a stop lamp and a turn signal lamp, in which a reflection surface is constructed with a number of reflection steps each shaped like a loop, and a method of forming the reflection mirror.

In recent automobile designs, the car body is made to have a rounded or streamlined shape in order to meet aerodynamic requirements and the demand for artistic design. Given this trend, vehicle lamps must be curved so as to conform with the outer line of the car body, or slanted with respect to the vertical direction (a so-called slanting tendency").

Under these circumstances, the body shape inevitably has some influence as to the shape of the reflection surface of the reflection mirror of the lamp. Accordingly, it is no longer possible to continue the use of the historically popular shape of the reflection surface, consisting of a single paraboloid of revolution.

With the slanting tendency of the front lens located in the front of the reflection mirror, it is required that the reflection mirror has the light distribution control function, which has been imparted to the front lens. Various measures have been taken to meet the requirement. Typically, the reflection surface is formed as a so-called multiple reflection surface," that is, it consists of the combination of a plural number of paraboloids of revolution or an aggregate of minute reflection surfaces.

In the reflection mirror disclosed in GB 2262980, for example, the reflection surface consists of reflection steps formed around the optical axis in a looped fashion. To form this reflection surface, a free curved surface (which cannot be precisely expressed by analytic expressions) is formed as a fundamental surface for the reflection surface. The surface of each of the reflection steps, which are formed on the fundamental surface, is formed in such a manner that a tangent vector of a minute reflection surface at a reflection point on the reflection step is equal to the outer product of the normal vector of the minute reflection surface at the reflection point and the normal vector of the tangent plane of the fundamental surface. To set a group of closed curves that are used as reference in forming the reflection steps, a reference line is set on the fundamental surface. A plural number of reflection points are put on the reference line. A minute reflection surface at each reflection point is obtained according to the law of reflection so that a light beam emitted from a light source toward the reflection points is reflected and then directed parallel to the optical axis. A vector is calculated which is the outer product of the normal vector of the minute reflection surface at the reflection point and the normal vector of the fundamental surface at the reflection point, and it is used as a direction vector to orient the formation of the reflection step. A closed curve is formed by applying a spline approximation in which the direction vectors at the reflection points around the optical axis are made the tangent vectors. Finally, a group of closed curves is formed as an aggregation of the closed curves at arbitrary reflection points.

A design freedom of the free curved surface as the fundamental surface for the reflection surface is very high. Because of this, the formed fundamental surface may be extremely complicated in shape. In such case, formation of the reflection steps on such a fundamental surface is difficult or a level difference between the adjacent reflection steps stands out. Further, a portion shadowed from light from the light source may appear.

SUMMARY OF THE INVENTION

To solve the problems mentioned above, there is provided a reflection mirror for a vehicle lamp, which comprises a reflection surface including a number of reflection steps defined by portions of the paraboloids of revolution and disposed between adjacent ones of closed curves formed as lines of intersection of a group of the paraboloids of revolution with different focal distances and a fundamental surface for the reflection surface, characterized in that (1) the fundamental surface for the reflection surface consists of a first curved surface portion and a second curved surface portion connected to the first curved surface portion in the n-th order continuity (N>1), (2) the first curved surface portion is shaped such that when a light beam, which is emitted from a point source supposed to lie on the principal optical axis of the reflection mirror, is reflected at a reflection point on the first curved surface portion, the light beam reflected thereat is directed substantially parallel to the principal optical axis of the reflection mirror, and (3) the second curved surface portion is shaped such that when a light beam, which is emitted from the point source, is reflected at a reflection point on the second curved surface portion, the light beam reflected thereat is diffused in a given direction.

In the present invention, the second curved surface portion is connected to the first curved surface portion having a shape of or similar to the paraboloid of revolution in the continuity of at least the 1st order on the fundamental surface for the reflection surface. Accordingly, when the reflection steps, shaped like loops, which are formed along the lines of intersection of the fundamental surface and the paraboloids of revolution, are formed, no level difference between the adjacent reflection steps is created.

DETAILED DESCRIPTION OF THE INVENTION

A reflection mirror for a vehicle lamp and a method of forming the reflection mirror according to the present invention, will be described with reference to the accompanying drawings.

Figure 1:
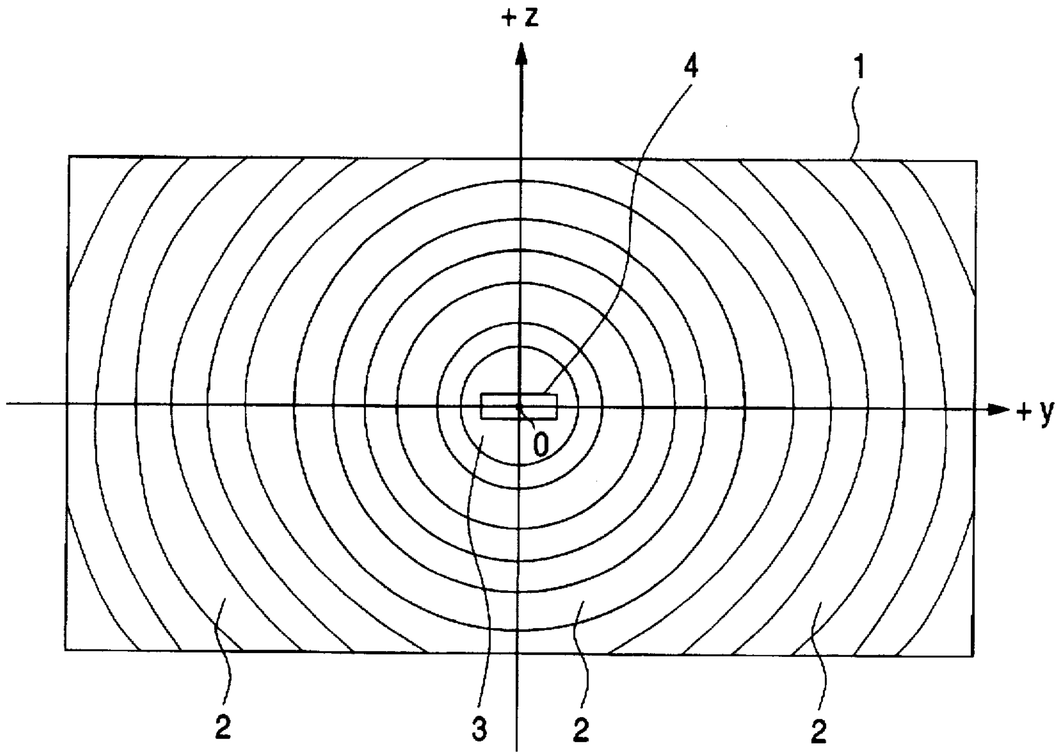
FIG. 1 is a front view schematically showing a reflection mirror for a vehicle lamp according to the present invention.

As schematically shown in FIG. 1, a number of reflection steps 2 shaped like loops are formed on a reflection mirror 1 for a vehicle lamp. In the figure, the x-axis is the principal optical axis, which extends in the frontward and rearward directions while passing through the center of a central part 3 of the loops bounding the reflection steps (the frontward direction is coincident with the illuminating direction of the reflection mirror 1). The y-axis is the horizontal axis orthogonal to the x-axis. The z-axis is a vertical axis orthogonal to the x- and y-axes. The origin of the orthogonal coordinates defined by these three axes is a point 0.

A light source element 4 is placed at a location somewhat ahead of the reflection mirror 1 on the x-axis. The light source element 4 may be a filament of a bulb or an arc of a discharging lamp.

FIGS. 2 to 8 show how to form a reflection surface of the reflection mirror 1.

Figure 2:
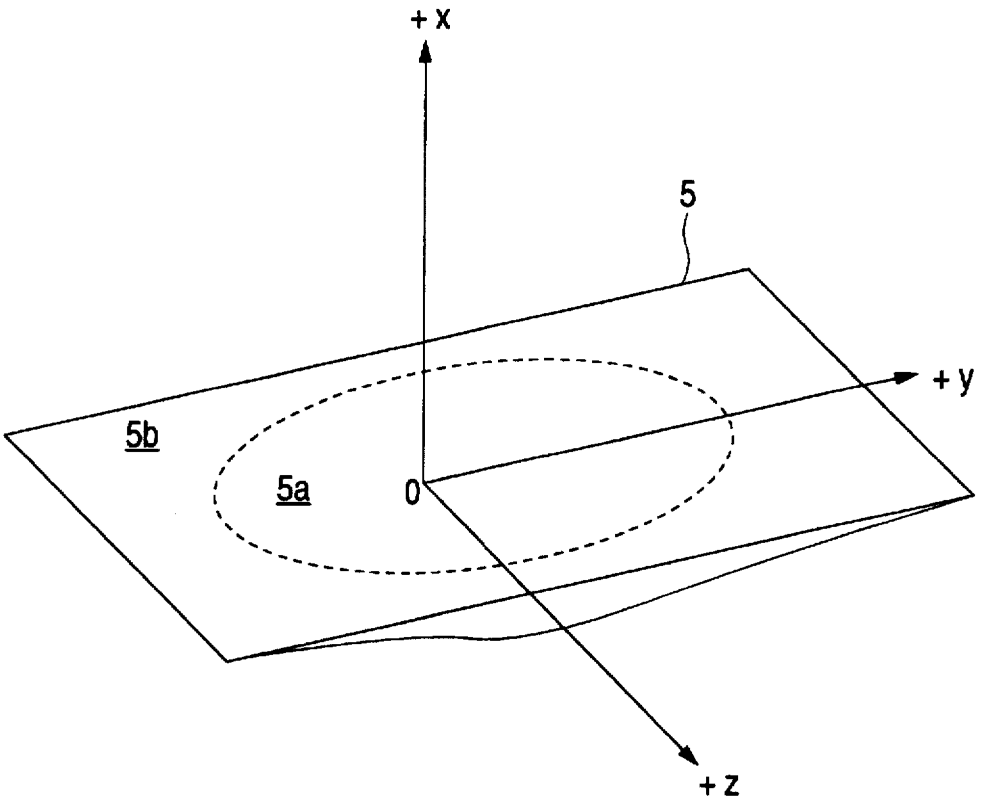
FIG. 2, together with FIGS. 3 to 8, is a diagram useful in explaining a method of forming a reflection surface according to the present invention.

To start, as shown in FIG. 2, a curved surface 5 that defines a basic shape of the reflection surface is set. The curved surface 5 is formed as a free curved surface, for example, by a CAD (computer aided design) system.

The curved surface 5 consists of two portions. g

A first curved surface portion **5*a* has a shape of, or is similar to, the paraboloid of revolution so that the light beams reflected by the first curved surface portion 5*a*** are parallel to the x-axis.

A second curved surface portion **5*b* is connected to the first curved surface portion 5*a* in an n-th order continuity (N≧1), and is shaped such that a light beam reflected by the second. curved surface portion 5*b*** progressively deviates from the x-axis as it advances. Here, the term "n-th order continuity" means that it is continuous in the derivative of the n-th order and the holomorphy holds.

Figure 3:
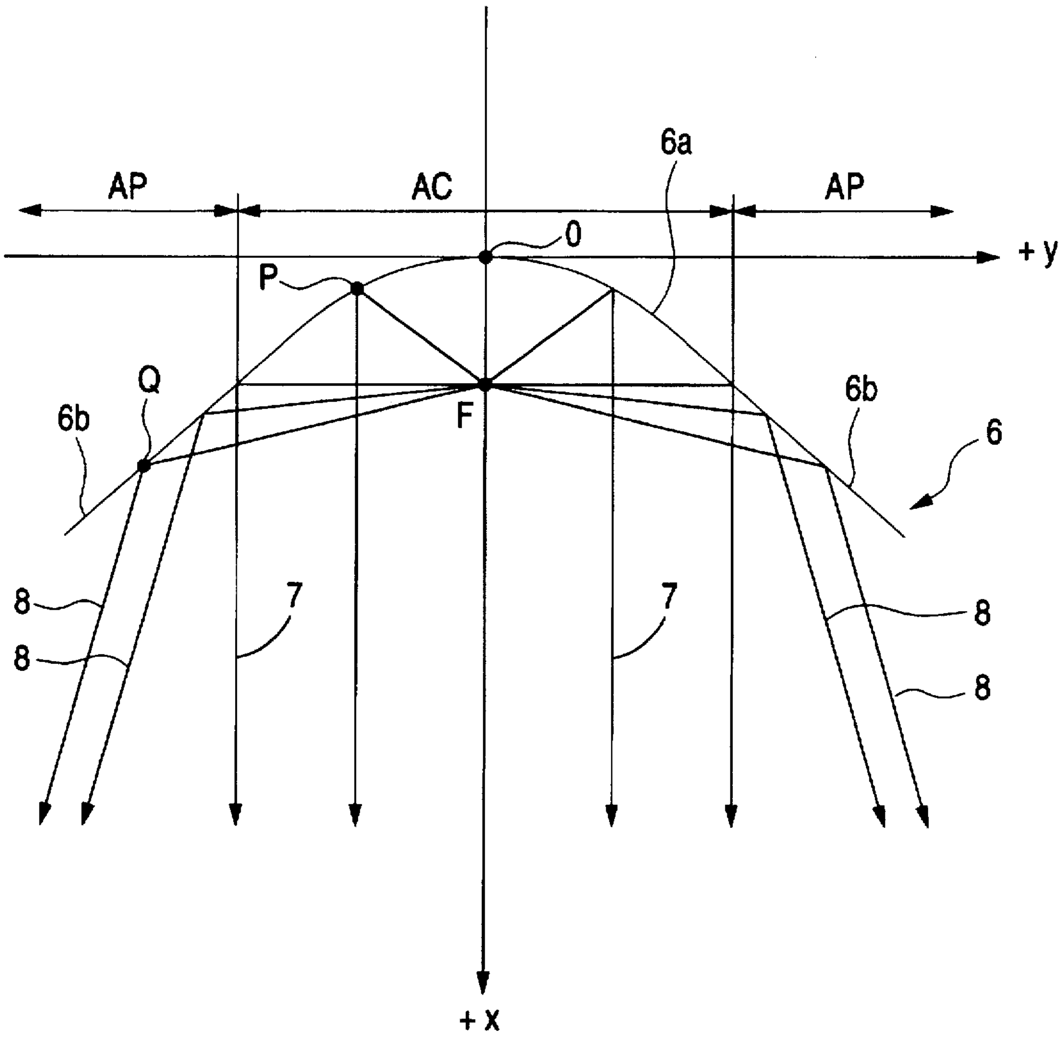
FIG. 3 is a horizontal sectional view showing a curved surface in which a second curved surface portion is continuously disposed outside a first curved surface portion having a shape similar to the paraboloid of revolution.

For example, in a horizontal sectional curve 6 of the curved surface 5 as shown in FIG. 3, a central portion **6*a* (a curved portion within a range "AC") which is located closer to the x-axis, is substantially parabolic. If a point light source is positioned at a point F on the x-axis, light beams 7 emitted from the point light source and reflected at arbitrary points P on the central portion 6*a*** are substantially parallel to the x-axis.

Peripheral portions (curved portions within the regions "AP") **6*b* and 6*b* of the horizontal sectional curve 6, which are continuous to both sides of the central portion 6*a*, are closer to the y-axis than the prolonged line of. the central portion 6*a*, in order that light beams emanating from the point F are diffused in the horizontal direction. That is, if the point light source is positioned at the point F on the x-axis, light beams 8 emitted from the point source and reflected at arbitrary points Q on the peripheral portions 6*b* and 6*b* progressively deviate from the x-axis as those advance. The peripheral portions 6*b* and 6*b*** are shaped such that the longer the foot of the perpendicular from the point Q to the x-axis is, the larger an angle of the reflection light beam with respect to the x-axis is.

Figure 4:
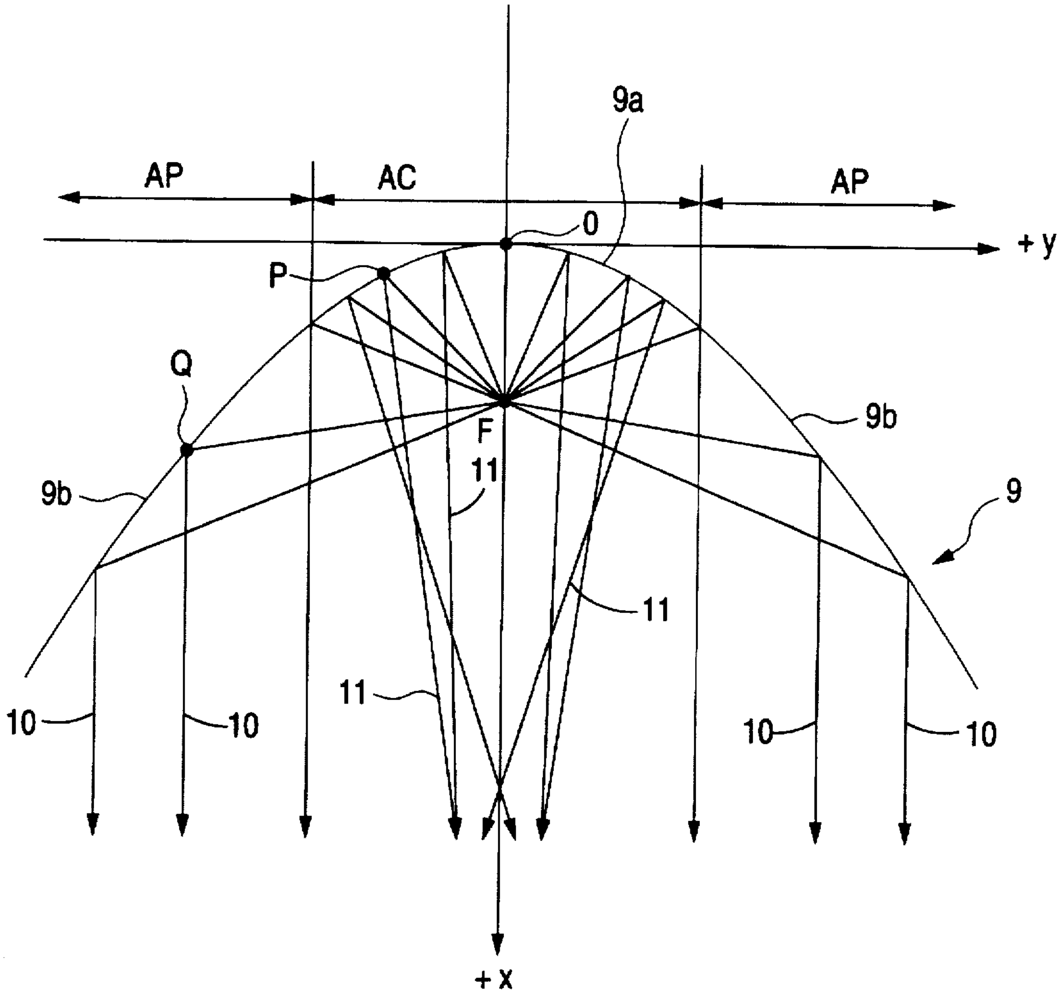
FIG. 4 is a horizontal sectional view showing a curved surface in which a first curved surface portion is continuously disposed inside a second curved surface portion having a shape similar to the paraboloid of revolution.

In a horizontal sectional curve 9 shown in FIG. 4, which illustrates another case reverse to the above one, the peripheral portions (curved portions within regions "AP") **9*b* and 9*b* located apart from the x-axis are substantially parabolic. If a point light source lies at a point F on the x-axis, the light beams 10 reflected at arbitrary points Q on the peripheral portions 9*b* and 9*b*** are substantially parallel to the x-axis.

A central portion **9*a* (a curved portion within a region "AC"), located between the peripheral portions 9*b* and 9*b* is shaped so as to reflect or diffuse the light beams emanating from the point F in the horizontal direction. If the point light source is positioned at the point F on the x-axis, the light beams 11 reflected at arbitrary points P on the central portion 9*a* are diffused in the horizontal direction after crossing the x-axis. The central portion 9*a*** is shaped such that as the longer the foot of the perpendicular from the point P (except the point lying on the x-axis) to the x-axis, the larger will be an angle of the reflection light beam with respect to the x-axis is.

As described above, if the point light source lies on the x-axis, the first curved surface portion **5*a* of the curved surface is shaped so as to reflect a light beam emitted from the point light source in the direction substantially parallel to the x-axis, and the second curved surface portion 5*b*** continuous to the first curved surface portion is shaped so as to reflect the light beams from the point light source in the horizontal direction.

Figure 5:
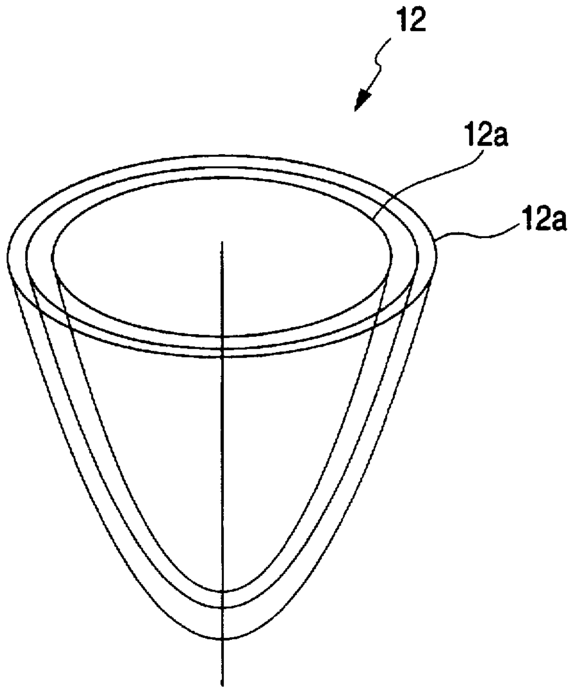
FIG. 5 is a diagram showing a group of paraboloids of revolution.

A group of paraboloids of revolution 12 for defining the performance of the reflection surface are prepared as shown in FIG. 5. A number of paraboloids of revolution **12*a* having a common rotation symmetric axis and different focal distances form the group 12. Those paraboloids of revolution 12*a* are selected so as not to spatially intersect. The focal positions of the paraboloids of revolution 12*a*** are not always coincident with each other (for example, the focal points may lie within a certain range on the common rotation symmetric axis).

Figure 6:
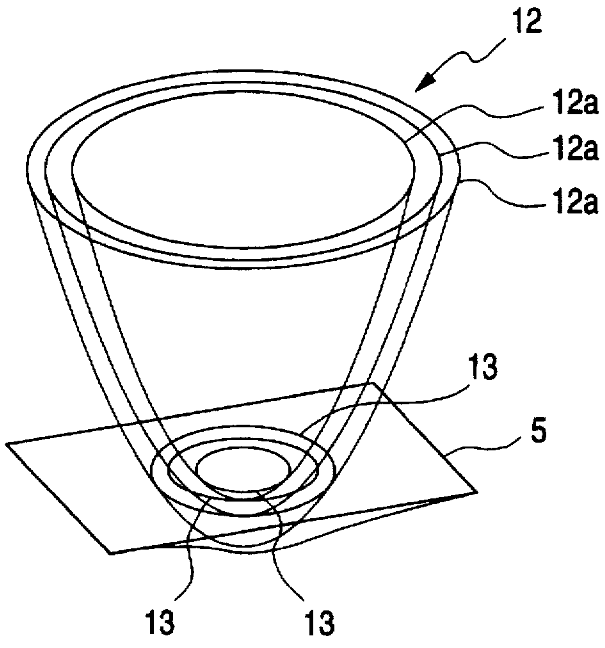
FIG. 6 is a diagram showing a group of closed curves formed as lines of intersection of the paraboloids of revolution and the fundamental surface.

Lines of intersection 13 of the curved surface 5 and the group of paraboloids of revolution 12 are determined as shown in FIG. 6. These intersecting lines 13 are each formed as a closed curves or a part of the closed curve, and never intersect one another on the curved surface 5. The center of a curve group consisting of the lines of intersection 13 is positioned at an intersecting point of the rotation symmetric axis and the curved surface 5, when the curved surface has the rotation symmetric axis.

Figure 7:
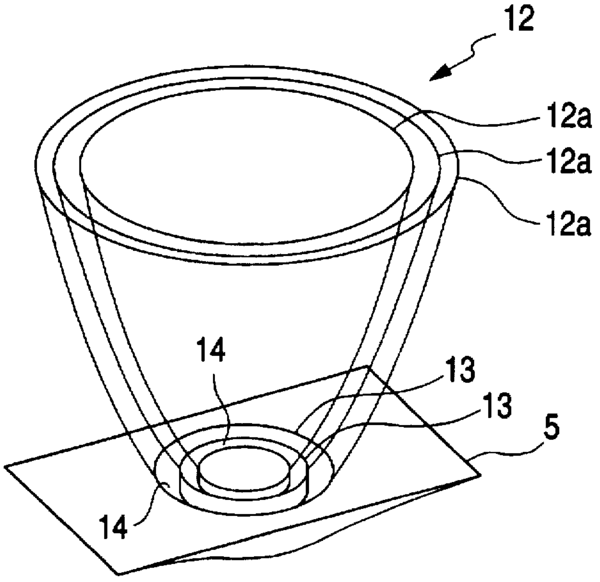
FIG. 7 is a diagram useful in explaining how to form reflection steps.

After the lines of intersection 13 are determined, reflection steps are formed using the intersecting lines. The reflection steps 14 are defined by portions of the respective paraboloids of revolution and are disposed between adjacent ones of the lines of intersection, as shown in FIG. 7.

Figure 8:
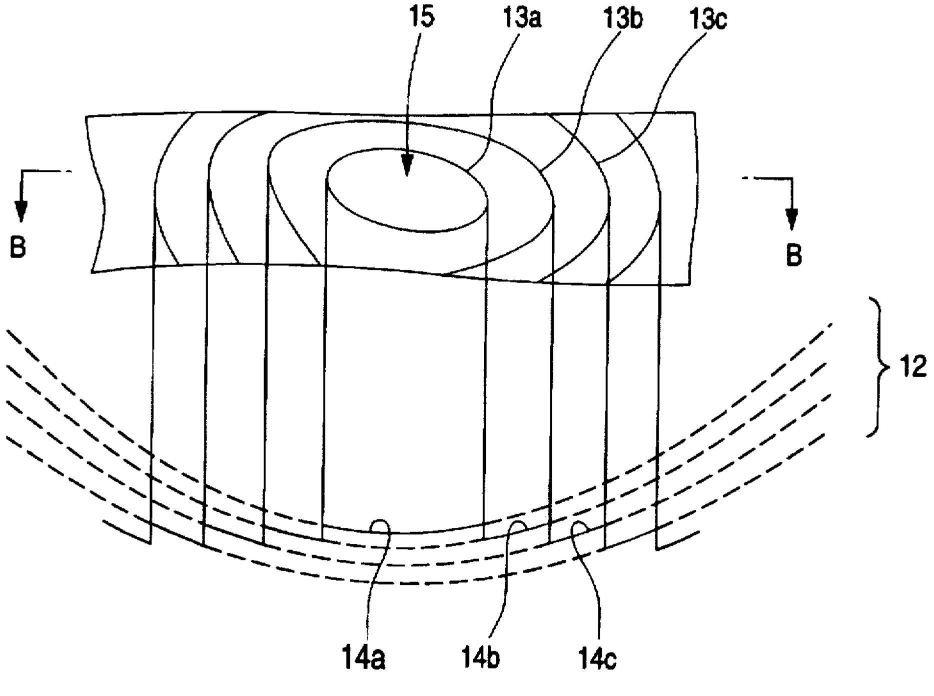
FIG. 8 is a diagram showing a reflection surface in front and sectional forms.

A front view of the lines of intersection on the curved surface 5 is given in the upper part of FIG. 8, and a cross sectional view taken on line B and B in the front view is given in the lower part of FIG. 8. The lines of intersection on the curved surface 5 are denoted as **13*a*, 13*b*, 13*c*, . . . in the order from the inner side, close to the center, of the closed curve 15 group to the outer side thereof. These lines of intersection will appear as the boundary lines of the reflection steps. In the figure, broken lines indicate the paraboloids-of-revolution group 12. The configurations of the reflection steps are determined in such a way that a reflection step 14*a* is formed 20 in an area defined by the line of intersection 13*a*; a reflection step 14*b* is formed in an area between the lines of intersection 13*a* and 13*b*; and a reflection step 14*c* 1S formed in an area between the lines of intersection 13*b* and 13*c***. The reflection step surfaces, respectively, are formed as parts of the paraboloids of revolution with different focal distances. The reflection surface having the reflection steps thus formed, when viewed in cross section, takes a saw-toothed or serrate profile.

After the reflection surface having the thus formed reflection steps and a reflection mirror having the reflection surface are thus formed by using a CAD system, CAM (computer aided manufacturing) data for forming a mold of the reflection mirror can be gathered from the reflection surface and the reflection mirror.

Figure 9:
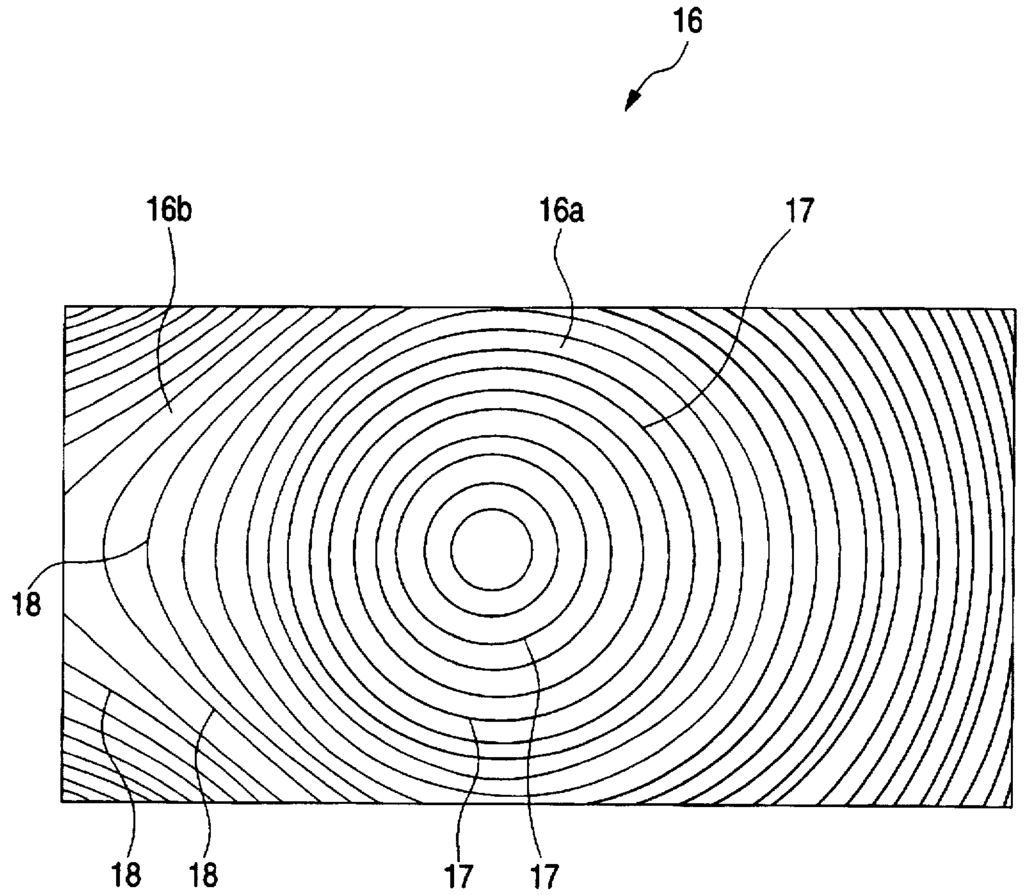
FIG. 9 is a diagram showing an example of the layout of a group of closed curves on the reflection surface.

FIG. 9 is a diagram showing an example of a configurative feature of the reflection surface formed by the above-mentioned method, viz., an example of the layout of closed curves on the curved surface 5.

As shown, in a curved surface 16, substantially rectangular when viewed from the front, a first curved surface portion 16*a* occupies most of the closed surface, and closed curves 17 formed thereon are substantially circular.

Closed curves 18 on a second curved surface portion 16*b* located on the left side of the first curved surface portion 16*a* are protruded to the left and are somewhat distorted.

Figure 10:
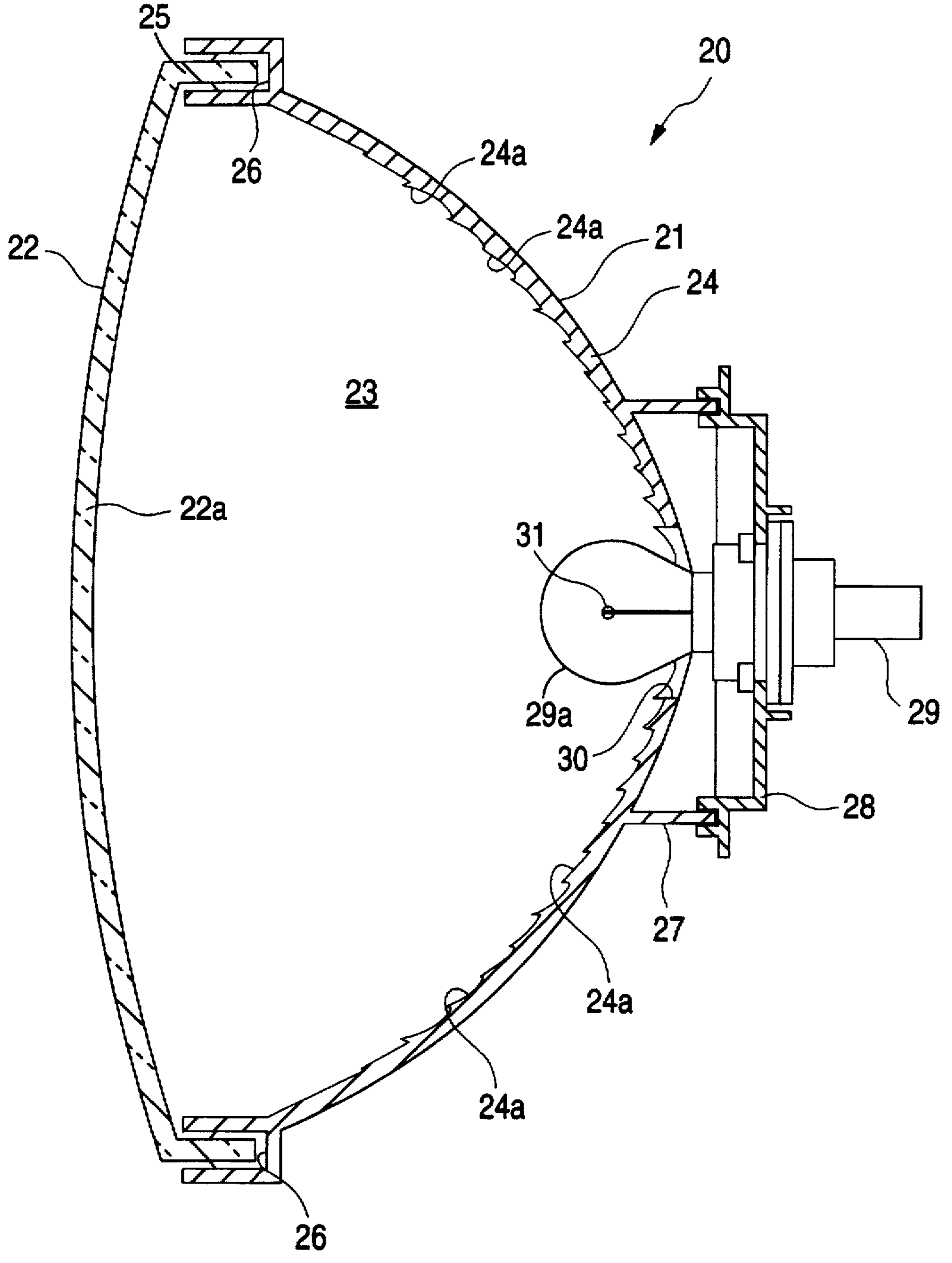
FIG. 10 is a vertical sectional view showing an example of a vehicle lamp according to the present invention.

FIG. 10 is a vertical sectional view showing an example of a reflection mirror for a vehicle lamp according to the present invention, the reflection mirror being applied to a fog lamp of an automobile.

In a lamp 20, a space 23 of the lamp is defined by a lamp body 21 opened frontward (the frontward direction is coincident with the illuminating direction of the lamp 20) and a front lens 22.

In a reflection mirror 24, the inner surface of a lamp body 21 is processed for reflection by aluminum deposition, for example. A number of reflection steps 24*a* are formed in the areas shaped like loops when viewed in the front. The fundamental surface of the reflection surface, as in the case of FIG. 3, is formed such that the central part thereof is shaped like the paraboloid of revolution, and the peripheral portion thereof is shaped so as to reflect the light beams in the horizontal direction.

The front lens 22 covering the opening of the lamp body 21 is firmly attached to the lamp body 21 in a manner such that a protruded part 25 protruded rearward from the outer circumference of the rear surface of the front lens 22 is fit to a lens mounting groove 26 with sealing material filled therebetween. Lens steps (e.g., fisheye lens steps), which form a shape like a lattice when viewed in the front, are formed on a lens portion 22*a* of the front lens 22.

A cylindrical portion 27, opened to the rear, is protruded rearward from the rear end of the lamp body 21. A bulb 29 is mounted on a bulb mounting plate 28, which is fixed to the rear end of the cylindrical portion 27. A glass housing 29*a* of the bulb 29 is inserted into the space 23 through a bulb insertion hole 30 of the lamp body 21, and positioned therein such that the center axis of a filament 31 in the glass housing 29*a* is extended horizontally, or in the direction at a right angle to the principal optical axis.

As seen from the foregoing description, no level difference is created between the first and second curved surface portions of the fundamental surface of the reflection surface. When the loop-like reflection steps are formed on the fundamental surface, no noticeable level difference is created between the adjacent reflection steps. Therefore, the formation of the reflection steps is easy. An area occupied by a portion shadowed from light from the light source is reduced, so that the reflection surface can be effectively used.

What is claimed is:

1. A reflection mirror for a vehicle lamp, the reflection mirror having a principal optical axis and comprising a reflection surface which includes a number of reflection steps defined by portions of respective paraboloids of revolution and disposed between adjacent ones of closed curves formed as lines of intersection of a group of the number of paraboloids of revolution with different focal distances and a fundamental surface for the reflection surface, wherein (1) the fundamental surface for said reflection surface comprises a first curved surface portion and a second curved surface portion connected to said first curved surface portion in a n-th order continuity ($N \geqq 1$), (2) said first curved surface portion having a shape such that when a light beam, which is emitted from a point light source assumed to lie on said principal optical axis of said reflection mirror, is reflected at a reflection point on said first curved surface portion, the light beam reflected thereat being directed substantially parallel to said principal optical axis of said reflection mirror, and (3) said second curved surface portion having a shape such that when a light beam, which is emitted from said point light source, is reflected at a reflection point on said second curved surface portion, the light beam reflected thereat is diffused in a given direction.

2. A reflection mirror for a vehicle lamp as recited in claim 1, wherein said first curved surface is proximate said optical axis and is interposed between said optical axis and said second curved surface.

3. A reflection mirror for a vehicle lamp as recited in claim 2, wherein said optical axis intersects said first curved surface.

4. A reflection mirror for a vehicle lamp as recited in claim 1, wherein said second curved surface is proximate said optical axis and is interposed between said optical axis and said first curved surface.

5. A reflection mirror for a vehicle lamp as recited in claim 4, wherein said optical axis intersects said second curved surface.

6. A reflection mirror for a vehicle lamp as recited in claim 1, wherein said first curved surface and said second curved surface comprise substantially all of the surface of said reflection surface of said reflection mirror.

7. A reflection mirror for a vehicle lamp as recited in claim 1, wherein said second curved surface is shaped such that as a foot of a perpendicular from a point on said optical axis to a point on said surface becomes longer, an angle of the reflection light beam with respect to said optical axis becomes greater.

8. A method of forming a reflection mirror for a vehicle lamp, the reflection mirror having a principal optical axis and comprising a reflection surface which includes a number of reflection steps defined by portions of respective paraboloids of revolution and disposed between adjacent ones of closed curves formed as lines of intersection of a group of the number of paraboloids of revolution with different focal distances and a fundamental surface for the reflection surface, comprising:

(1) a first step of forming the fundamental surface for the reflection surface comprising a first curved surface portion and a second curved surface portion connected to said first curved surface portion in an n-th order continuity ($N \geqq 1$), said first curved surface portion being shaped such that when a light beam, which is emitted from a point light source assumed to lie on said principal optical axis of the reflection mirror, is reflected at a reflection point on the first curved surface portion, the light beam reflected thereat being directed substantially parallel to said principal optical axis of the reflection mirror, and said second curved surface portion being shaped such that when a light beam, which is emitted from said point light source, is reflected at a reflection point on said second curved surface portion, the light beam reflected thereat is diffused in a given direction;

2) a second step of defining a group comprising a plurality of paraboloids of revolution having a common axis but each with a different focal distance;

3) a third step of determining a group of closed curves formed as lines of intersection of the fundamental surface for the reflection surface and the paraboloids of revolution; and 4) a fourth step of forming a number of loop-like reflection steps defined by portions of the respective paraboloids of revolution and disposed between adjacent ones of the closed curves.

9. A method of forming a reflection mirror for a vehicle lamp as recited in claim 8 wherein said forming step comprises forming said first curved surface to be proximate said optical axis and be interposed between said optical axis and said second curved surface.

10. A method of forming a reflection mirror for a vehicle lamp as recited in claim 8 wherein said forming step comprises forming said second curved surface to be proximate said optical axis and be interposed between said optical axis and said first curved surface.

11. A method of forming a reflection mirror for a vehicle lamp as recited in claim 8 wherein said forming step comprises forming said first curved surface and said second curved surface such that they comprise substantially all of the surface of said reflection surface of said reflection mirror.

12. A reflection mirror for a vehicle lamp, the reflection mirror having a principal optical axis and comprising a reflection surface which includes a number of reflection steps defined by portions of respective paraboloids of revolution and disposed between adjacent ones of closed curves formed as lines of intersection of a group of the number of paraboloids of revolution with different focal distances and a fundamental surface for the reflection surface, said reflection mirror being defined to have a shape according to a method comprising:

(1) a first step of forming the fundamental surface for the reflection surface comprising a first curved surface portion and a second curved surface portion connected to said first curved surface portion in an n-th order continuity ($N \geqq 1$), said first curved surface portion being shaped such that when a light beam, which is emitted from a point light source assumed to lie on said principal optical axis of the reflection mirror, is reflected at a reflection point on the first curved surface portion, the light beam reflected thereat being directed substantially parallel to said principal optical axis of the reflection mirror, and said second curved surface portion being shaped such that when a light beam, which is emitted from said point light source, is reflected at a reflection point on said second curved surface portion, the light beam reflected thereat is diffused in a given direction;

2) a second step of defining a group comprising a plurality of paraboloids of revolution having a common axis but each with a different focal distance;

3) a third step of determining a group of closed curves formed as lines of intersection of the fundamental surface for the reflection surface and the paraboloids of revolution; and 4) a fourth step of forming a number of loop-like reflection steps defined by portions of the respective paraboloids of revolution and disposed between adjacent ones of the closed curves.

13. A reflection mirror for a vehicle lamp as recited in claim 12 wherein said forming step comprises forming said first curved surface to be proximate said optical axis and be interposed between said optical axis and said second curved surface.

14. A reflection mirror for a vehicle lamp as recited in claim 12 wherein said forming step comprises forming said second curved surface to be proximate said optical axis and be interposed between said optical axis and said first curved surface.

15. A reflection mirror for a vehicle lamp as recited in claim 12 wherein said forming step comprises forming said first curved surface and said second curved surface such that they comprise substantially all of the surface of said reflection surface of said reflection mirror.

* * * * *